US008861803B2

(12) United States Patent
Yano et al.

(10) Patent No.: US 8,861,803 B2
(45) Date of Patent: Oct. 14, 2014

(54) IMAGE RECOGNITION APPARATUS, IMAGE RECOGNITION METHOD, AND PROGRAM

(75) Inventors: Kotaro Yano, Tokyo (JP); Hiroshi Sato, Kawasaki (JP); Shunsuke Nakano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/436,585

(22) Filed: Mar. 30, 2012

(65) Prior Publication Data
US 2012/0257799 A1    Oct. 11, 2012

(30) Foreign Application Priority Data
Apr. 5, 2011    (JP) .................. 2011-083836

(51) Int. Cl.
G06K 9/46    (2006.01)
G06K 9/00    (2006.01)

(52) U.S. Cl.
CPC .................. *G06K 9/00281* (2013.01)
USPC ....................................... 382/118

(58) Field of Classification Search
None
See application file for complete search history.

(56) References Cited

U.S. PATENT DOCUMENTS

| 7,773,798 | B2* | 8/2010 | Toyama et al. ............... 382/154 |
| 2007/0053590 | A1* | 3/2007 | Kozakaya ..................... 382/181 |
| 2008/0175448 | A1* | 7/2008 | Fujiwara et al. .............. 382/118 |
| 2010/0026842 | A1* | 2/2010 | Ishizaka ..................... 348/231.2 |

OTHER PUBLICATIONS

Pentland, Moghaddam and Starner. View-based and modular eigenspaces for face recognition. Proceedings of the IEEE Conference on Computer Vision and Pattern Recognition.
Kumar, Berg, Belhumeur and Nayar. Attribute and Simile Classifiers for Face Verification. IEEE 12th International Conference on Computer Vision.

* cited by examiner

*Primary Examiner* — Stephen R Koziol
*Assistant Examiner* — Delomia Gilliard
(74) *Attorney, Agent, or Firm* — Canon USA, Inc. IP Division

(57) ABSTRACT

An image recognition apparatus includes an extraction unit configured to extract a feature quantity for each local area from an input image, a conversion unit configured to convert the feature quantity extracted by the extraction unit into a feature quantity indicating a degree with respect to an attribute for each local area, a verification unit configured to verify the feature quantity converted by the conversion unit against a feature quantity of a registered image, and an identification unit configured to identify whether the input image is identical to the registered image by integrating the verification result for each local area acquired by the verification unit.

7 Claims, 4 Drawing Sheets

● ••• FEATURE POINT

IMAGE RECOGNITION APPARATUS, IMAGE RECOGNITION METHOD, AND PROGRAM

BACKGROUND OF THE INVENTION

1. Field of the Invention

The present invention relates to an image recognition apparatus, an image recognition method, and a program.

2. Description of the Related Art

Conventionally, a face recognition technique for identifying a person such that a face area (i.e., face image) is extracted from an image including a person's face to compare thus extracted face image with a face image of a specific person who is preliminary registered is known.

The above technique is used for a security purpose, e.g., for allowing a person appearing in camera to enter into an office when the person appearing in camera is verified as a registrant. On the other hand, there is a demand for using the technique for searching a picture in which the same person appears.

In the former use, limiting conditions imposed on taking a picture of a person enable a highly accurate recognition of the person. In the latter use, however, there is such a problem that degradation of recognition accuracy of the person occurs since shooting conditions of the person are wide ranging. For example, such a false recognition may occur that the person may be recognized as a different person even if the same person is in the pictures when the pictures are taken with a different face direction, a different facial expression, and different lighting upon taking each picture.

To solve the above problem, a recognition method in which a plurality of local areas is extracted from a face image to recognize the person based on similarities of the local areas is proposed. For example, a method in which the verification is made against each local area of the face image by the principal component analysis to improve a robustness of a face direction and a hidden face is discussed (refer to Pentland, Moghaddam and Starner. View-based and modular eigenspaces for face recognition. Proceedings of the IEEE Conference on Computer Vision and Pattern Recognition (CVPR'94), which hereinafter will be referred to as "Literature 1"). The local areas here are parts representing characteristic areas of a face such as eyes, a nose, and a mouth.

In addition, not merely based on the similarity of an image, a method in which the recognition accuracy is remarkably improved by personal identification of a face based on an attribute and a similarity with a representative person is discussed (refer to Kumar, Berg, Belhumeur and Nayar. Attribute and Simile Classifiers for Face Verification. IEEE 12th International Conference on Computer Vision (ICCV2009), which hereinafter will be referred to as "Literature 2"). The attribute here is exemplified by "big, round eyes" and "slender eyes", i.e., types of a shape of the eyes, in a case of the eyes. The similarity with the representative person here is exemplified by "similar to the eyes of Mr. A" and "similar to the eyes of Mr. B". In the following description, the attribute includes the similarity with the representative person.

In other words, in Literature 2, the recognition is performed based on a determination that when a person of an input face image and a person of a registered face image, i.e., a registrant's face image, have the same attribute, both persons are the same person.

However, in the method of Literature 2, identification processing is performed by a support vector machine using an Radial Basis Function (RBF) kernel in order to acquire a degree with respect to a certain attribute of the local area. The identification processing is performed with a plurality of feature quantities selected by previous learning.

This is because the method of Literature 2 requires a high accuracy in identifying the attribute. As a result thereof, the identification processing for identifying the attribute has complexity. It is difficult to be hard-wired because of the complexity of the identification processing.

SUMMARY OF THE INVENTION

The present invention provides a method for recognizing an image easier while taking advantage of an image recognition performed based on an attribute of each local area.

According to an aspect of the present invention, an image recognition apparatus includes an extraction unit configured to extract a feature quantity for each local area from an input image, a conversion unit configured to convert the feature quantity extracted by the extraction unit into a feature quantity representing a degree with respect to an attribute for each local area, a verification unit configured to verify the feature quantity converted by the conversion unit against a feature quantity of a registered image, and an identification unit configured to identify whether the input image is identical to the registered image by integrating the verification result for each local area acquired by the verification unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
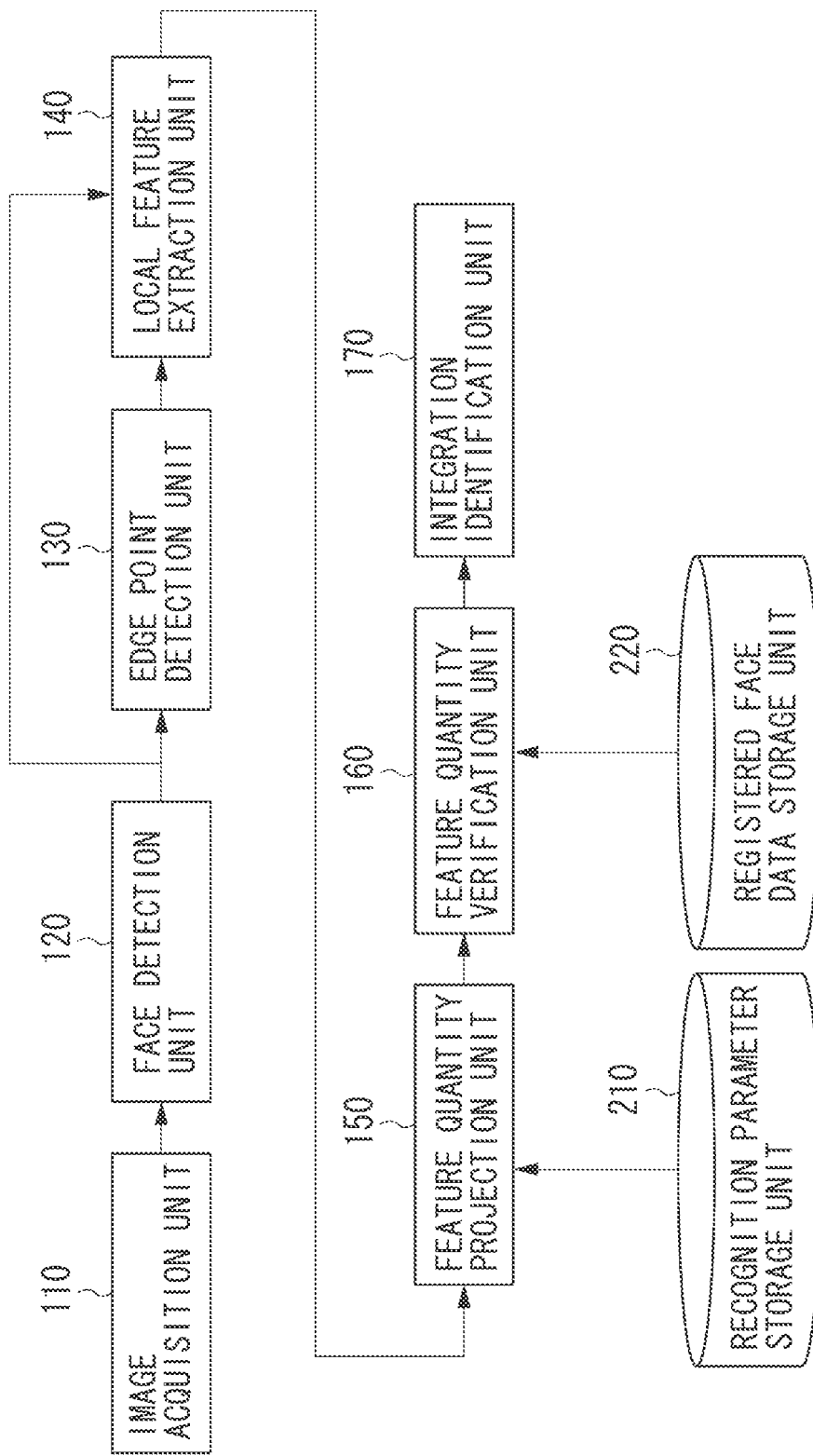
FIG. 1 illustrates an example of a configuration of an Image recognition apparatus.

FIG. 1 illustrates an example of a configuration of an image recognition apparatus according to the present exemplary embodiment. An image acquisition unit 110 acquires image data captured by an image capturing unit such as a camera. A face detection unit 120 clips out a face area (i.e., face image) from the image data acquired by the image acquisition unit 110. An edge point detection unit 130 detects edge points of face parts such as eyes, a nose, and a mouth representing features of a face from the face image clipped out by the face detection unit 120.

A local feature extraction unit 140 clips out a plurality of local areas based on positions of the edge points detected by the edge point detection unit 130 from the face image clipped out by the face detection unit 120 to acquire feature quantities for recognizing a face of the below described registered image from the clipped local areas.

A feature quantity projection unit 150 projects the feature quantity (i.e., local feature quantity) of the local area acquired by the local feature extraction unit 140 to a feature quantity representing a degree with respect to a predetermined attribute. At the time, the feature quantity projecting unit 150 reads out a projection matrix stored in a recognition parameter storage unit 210 to calculate the feature quantity representing the degree with respect to the predetermined attribute for each local area by using the projection matrix.

A feature quantity verification unit 160 verifies the feature quantity projected by the feature quantity projecting unit 150 against the feature quantity preliminary registered in a registered face data storage unit 220, thereby acquiring degree of similarity therebetween. An integration identification unit 170 integrates the degree of similarity resulting from the verification of each local area acquired by the feature quantity verification unit 160 and determines whether the person of the clipped face image is the person of the registered image.

The recognition parameter storage unit 210 is a memory for storing the projection matrix acquired by the previous learning to be used by the feature quantity projecting unit 150. The registered face data storage unit 220 is a memory for storing, for example, the feature quantity acquired from the face image (as an example of the registered image) of a specific person preliminary registered for the purpose of being used by the feature quantity verification unit 160.

Figure 2:
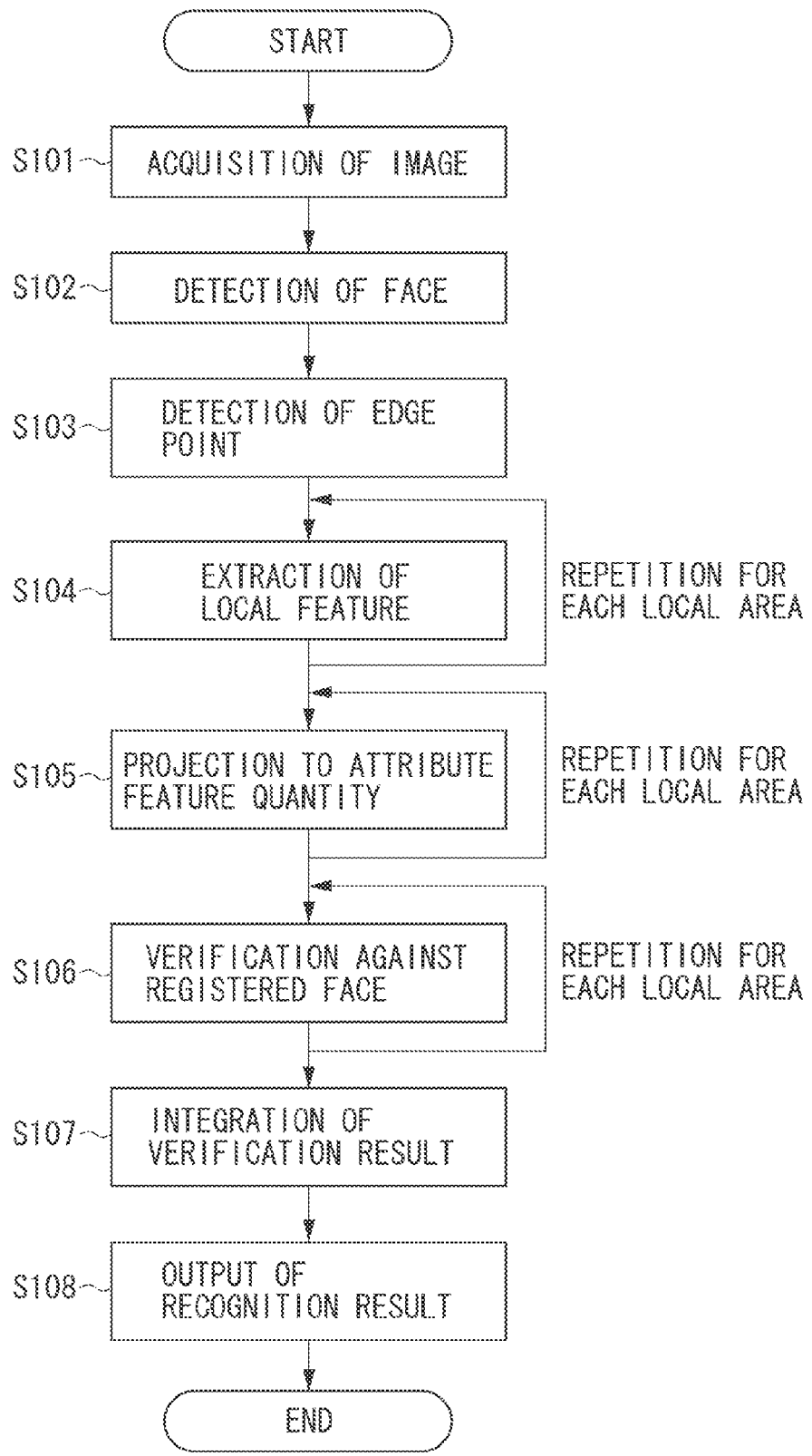
FIG. 2 illustrates an example of a flow chart according to recognition processing.

An operation of the image recognition apparatus will be described below with reference to a flow chart of FIG. 2. FIG. 2 illustrates an example of a flow chart according to recognition processing.

In step S101, the image acquisition unit 110 acquires image data (i.e., input image) captured by an image capturing unit such as a camera. Thus acquired image data is stored in a built-in memory of the image acquisition unit 110. At the time, it is provided that the acquired image data is a luminance image. When the image acquisition unit 110 acquires a color image of RGB colors, the image acquisition unit 110 converts the acquired color image into a luminance image to store it.

In step S102, the face detection unit 120 clips out the face area from the image data acquired by the image acquisition unit 110. For example, the face detection unit 120 acquires a position of the face area in the input image stored in the memory of the image acquisition unit 110. The face detection unit 120 allows the detected face area to be zoomed into a predetermined size (e.g., 100×100 pixels) and stores the zoomed face image in a built-in memory of the face detection unit 120.

Figure 3:
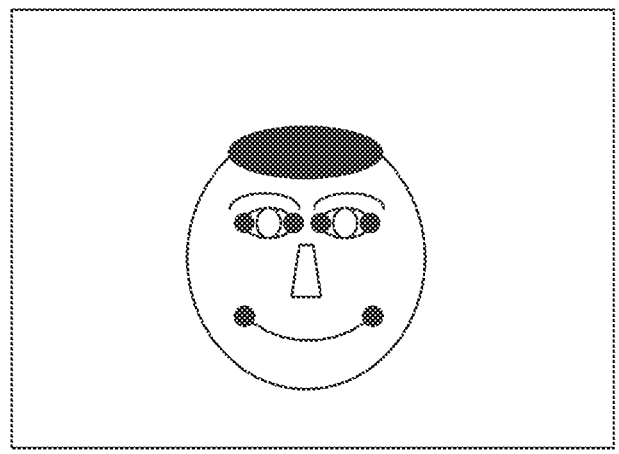
FIG. 3 illustrates examples of edge points.

In step S103, the edge point detection unit 130 detects the edge points of the face parts of, for example, the eyes, the nose, and the mouth representing features of a face from the face image clipped out by the face detection unit 120. For example, the edge point detection unit 130 detects positions of both edge points of tails of both eyes, inner corners of both eyes, and a right edge and a left edge of the mouth in a manner as illustrated in FIG. 3. The coordinates of the detected positions of the edge points are stored in a built-in memory of the edge point detection unit 130.

Figure 4:
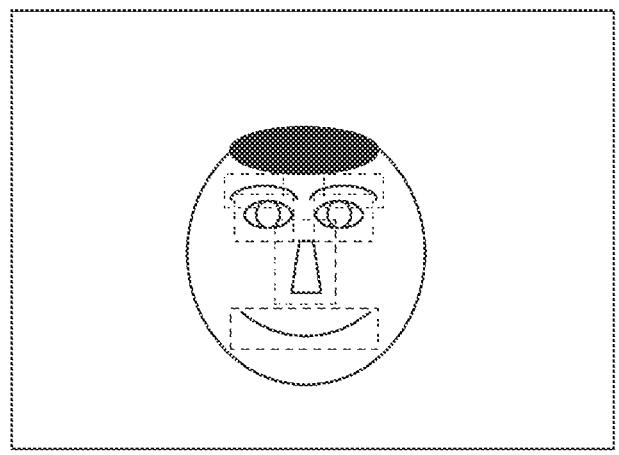
FIG. 4 illustrates examples of local areas.

In step S104, the local feature extraction unit 140 clips out the local areas based on the positions of the edge points detected by the edge point detection unit 130 from the face image clipped out by the face detection unit 120 and acquires the feature quantities used in recognizing the face from the local areas thus clipped out. For example, the local feature extraction unit 140 clips out total six areas, i.e., areas of the right eye, the left eye, the right eyebrow, the left eyebrow, the nose, and the mouth, as the local areas in a manner as illustrated by broken lines of FIG. 4.

For example, when the local feature extraction unit 140 clips out the area of the left eye, the local feature extraction unit 140 refers to the coordinates of the positions of the tail and the inner corner of the left eye stored in the built-in memory of the edge point detection unit 130 to clip out the area of the left eye from the face image stored in the built-in memory of the face detection unit 120. More specifically, the local feature extraction unit 140 acquires the coordinates of the positions of four corners of the area of the left eye in the face image from the coordinates of the positions of the tail and the inner corner of the left eye based on a predetermined geometric relationship to provide a geometric transform so as to form the area of the left eye into a predetermined square shape, thereby acquiring an image of the local area of the left eye. The local area is transformed so as to be a square-shaped area having a size of, for example, 30×31 pixels.

The local feature extraction unit 140 acquires the local feature quantity from thus acquired image of the local area. In the present exemplary embodiment, the local feature extraction unit 140 acquires an increment sign feature quantity as the local feature quantity. The increment sign feature quantity indicates a tendency of increase or decrease of luminance of neighboring pixels. The feature quantity is expressed here by 1 bit based on a magnitude relation between an upper pixel and a lower pixel. In addition, the increment sign feature quantity has a robust feature in an illumination variation.

Thus acquired feature quantity having a size of 30×30 pixels and 1 bit per pixel, i.e., 900 bits is stored in the built-in memory of the local feature extraction unit 140. Similarly, with respect to the other local areas, the local feature extraction unit 140 clips out image data from the face image stored in the built-in memory of the face detection unit 120 based on each coordinate of the positions of the edge points to be referred to, thereby acquiring the feature quantities thereof.

In addition, the sizes of the local areas may be acquired such that each local area has its own suitable size, or all the local areas have the same size. Further, the feature quantities may be acquired from more number of local areas. A case where the increment sign is used as the feature quantity is described here. However, the feature quantity of, for example, a luminance gradient histogram and Gabor wavelet may be used here or the feature quantity of a combination thereof may also be used here.

In step S105, the feature quantity projection unit 150 projects the local feature quantity acquired by the local feature extraction unit 140 to the feature quantity indicating a degree with respect to a predetermined attribute. A case where the similarity with the representative person is used as the attribute will be described here.

A method for acquiring a projection matrix by previous learning will be described below. The previous learning may be performed by the image recognition apparatus or may be performed by the other apparatus different from the image recognition apparatus.

A face image of a representative person is decided as a reference. In addition to the above, face images for the purpose of learning are preliminary collected on the order from several thousands to several tens of thousands of samples. With respect to training data used in learning, for example, a comparison (classification) of the image of the left eye is made as to whether each of the face images for learning resembles "left eye of Mr. A" from the face image of the representative person, an annotation is attached thereto based on the above classification result.

A plurality of samples may be used as the image corresponding to the "left eye of Mr. A" in the face image of the representative person. For example, the plurality of samples is the images of the left eye which are extracted from the samples of images captured with different face directions, different facial expressions, and different illumination conditions.

Learning is performed by using a linear support vector machine such that a difference between the classification result acquired from the images for learning and the training data and a result assumed based on the local areas of the image samples is as small as possible. The acquired coefficient of linear projection is set as a coefficient with respect to the attribute representing the similarity with the "left eye of Mr. A".

Similarly, a coefficient with respect to the attribute representing the similarity with the "left eye of Mr. B" is acquired. Thus acquired coefficient vectors are formed into the projection matrix and are stored in the recognition parameter storage unit 210. In other words, each row vector of the projection matrix becomes a conversion factor for converting into the attribute representing the similarity with the respective representative persons. The desirable number of attributes indicating the representative person is a range between several tens and a hundred such that the features of various persons can be captured.

Increase of the number of attributes to some extent enables an expression of the attributes of the input face image by a simple projection. Similarly, the projection matrixes are acquired for the other local areas. The number of attributes to be projected may be changed for each local area or may be the same for all the local areas. The projection matrix may be acquired by a linear regression of, for example, a least square method after attaching an annotation representing to what degree the image of the left eye of the training data resembles the "left eye of Mr. A" instead of attaching whether the image of the left eye of the training data resembles. Alternatively, the projection matrix may be acquired by a robust estimation such as an LMedS Estimation.

Figure 5:
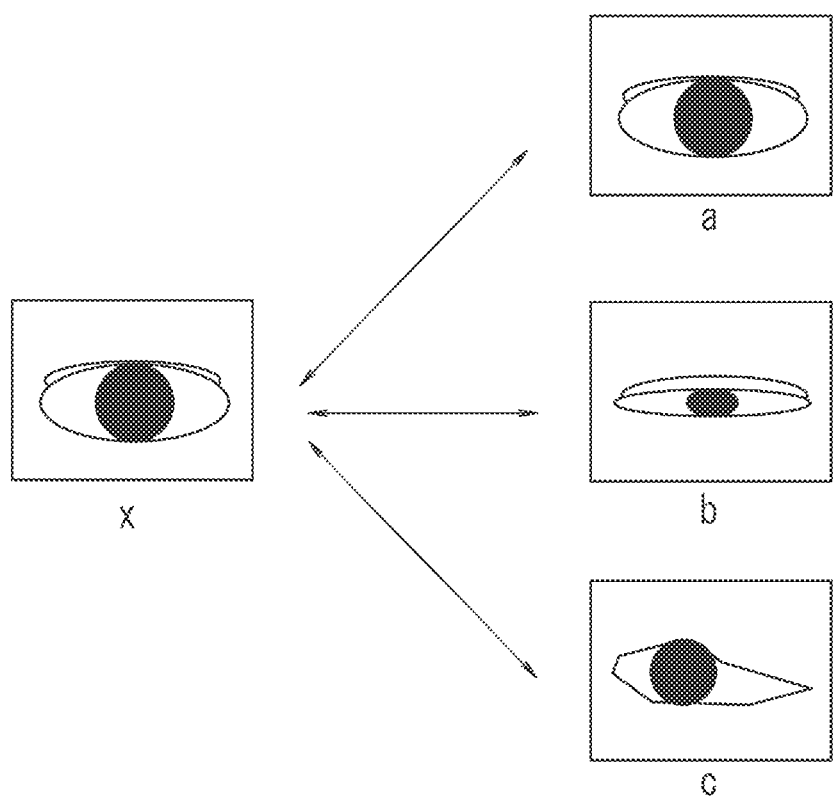
FIG. 5 illustrates examples of attributes of local areas.

A method of the projection to the feature quantity representing each attribute is simple. That is, only the input local feature quantity is projected to be converted by using the projection matrix acquired by the above described method. The feature quantity after the conversion becomes a vector having dimensions corresponding to the number of attributes representing the similarity with the representative person and is stored in the built-in memory of the feature quantity projecting unit 150. For example, as illustrated in FIG. 5, when a pattern x is input as the local area image, the similarity is high in the left eye of a pattern a, whereas the similarity is low in the left eyes of a pattern b and a pattern c. The result is used in the below described verification processing as the feature quantity representing the attribute of each local area. The projection of the local feature quantity is repeated for the number corresponding to the number of local areas.

In step S106, the feature quantity verification unit 160 verifies the feature quantity projected by the feature quantity projection unit 150 against a feature quantity preliminary registered in the registered face data storage unit 220 to acquire the similarity therebetween. The feature quantity of the registered face (i.e., registered face image) is a feature quantity that is converted to the degree with respect to the attribute representing the similarity with each representative person acquired in the above described processing steps S101 through S105 in a manner similar to the input face image. The verification between the feature quantities is performed by a calculation of the Manhattan distance for each local area and the inverse thereof represents the degree of similarity.

The Euclidean distance and the Mahalanobis' generalized distance in view of a data distribution may be used for the method of the distance calculation in addition to the Manhattan distance. Also, a method of acquiring the degree of similarity by a cosine similarity may be used. The verification processing with respect to the registered face is repeated for each local area.

In step S107, the integration identification unit 170 integrates the degree of similarity for each local area acquired by the feature quantity verification unit 160 to determine whether the person of the input face image is the person of the registered face image. In the present exemplary embodiment, the integration identification unit 170 simply takes the sum of the similarities to consider it as the degree of similarity with the registered face image. At the time, when the similarity with the registered face image in the local area is remarkably low, the integration identification unit 170 may consider an average value of the similarities, excepting for the above similarity, as the degree of similarity of the entire face. When the input face image is partially hidden, the verification with more robustness can be performed.

The integration identification unit 170 determines that the person of the input face image is the same person as the person of the registered face image when the degree of similarity of the entire face is equal to or more than a predetermined value.

A case where the present exemplary embodiment is applied to the singular registered person is described above; however, the present exemplary embodiment is also applicable to a case of the plurality of the registered persons. For example, the above described processing steps S106 and S107 are repeated for each registered face image of the registered person and, when there is the plurality of registered face images having the degree of similarity equal to or more than the predetermined value, the integration identification unit 170 determines that a person of the registered face image having the maximum degree of similarity is the person of the input face image. In step S108, the integration identification unit 170 outputs the recognition result.

A case where the present exemplary embodiment is applied to the person identification for identifying a face of the person is exemplified above. As described above, the present exemplary embodiment is configured to cause the feature quantity of the local area to project to a space (i.e., attribute space) representing the predetermined attribute to verify the feature quantity of the local area against the attribute of the local area of the registered face image. In other words, since the attribute identification is performed with a conversion by using the projection matrix, a highly accurate image recognition method can be realized based on the attribute according to a relatively simple processing suitable to be hard-wired.

According to the present exemplary embodiment, since the simple projection enables the projection of the feature quantity to the attribute space, increase of the number of the local areas and increase of the number of the attributes for the purpose of improving the accuracy of the recognition processing can be realized relatively with ease.

In the present exemplary embodiment, the face recognition is exemplified. However, the present exemplary embodiment is widely applicable to applications for identifying whether an input image is an object included in a range of a predetermined category. For example, the present exemplary embodiment can be applied to a classification of animal faces, i.e., classification as to whether a face image is a dog face, a cat face, or a dog face of which kind.

According to the above described exemplary embodiment, the image can be recognized easier while taking advantage of the image recognition performed based on the attribute for each local area.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-083836 filed Apr. 5, 2011, which is hereby incorporated by reference herein in its entirety.

What is claimed is:

1. An image recognition apparatus comprising:
an extractor that extracts a feature quantity for each local area from an input image;
a converter that converts the feature quantity for each local area extracted by the extractor into a feature quantity representing respective degrees of similarities with a plurality of representative patterns;
a verifier that verifies the feature quantity for each local area converted by the convertor against a feature quantity of a registered image, the feature quantity of the registered image representing respective degrees of similarities with the plurality of representative patterns; and
an identifier that identifies whether the input image is identical to the registered image by integrating verification results for a plurality of local areas acquired by the verification unit.

2. The image recognition apparatus according to claim 1, wherein the converter performs the conversion by a projection using a projection matrix.

3. The image recognition apparatus according to claim 2, wherein the projection matrix is configured such that preliminary collected image samples are classified as to whether each attribute for each local area thereof belongs to the attribute and a difference between the classified result and a result assumed based on the local area of the image sample is as small as possible.

4. The image recognition apparatus according to claim 1, wherein the registered image is a face image of a person and the attribute is an attribute of a face part.

5. The image recognition apparatus according to claim 4, wherein the attribute of the face part is a similarity with a face part of a representative person.

6. An image recognition method comprising:
extracting a feature quantity for each local area from an input image;
converting the extracted feature quantity for each local area into a feature quantity representing respective degrees of similarities with a plurality of representative patterns;
verifying the converted feature quantity for each local area against a feature quantity of a registered image, the feature quantity of the registered image representing respective degrees of similarities with the representative patterns; and
identifying whether the input image is identical to the registered image by integrating verification results for each local area.

7. A non-transitory computer-readable storage medium storing a control program for causing a computer to execute each operation of the image recognition method according to claim 6.

* * * * *